United States Patent
Kotre et al.

(10) Patent No.: US 6,664,651 B1
(45) Date of Patent: Dec. 16, 2003

(54) ENGINE ON IDLE ARBITRATION FOR A HYBRID ELECTRIC VEHICLE

(75) Inventors: Stephen John Kotre, Ann Arbor, MI (US); Deepa Ramaswamy, Ypsilanti, MI (US); Joanne Theresa Woestman, Dearborn, MI (US); Mary Theresa Breida, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 122 days.

(21) Appl. No.: 09/712,436

(22) Filed: Nov. 14, 2000

(51) Int. Cl.[7] .............................. B60K 6/04; G08G 1/09
(52) U.S. Cl. ..................... 290/29; 290/40 R; 290/40 B; 290/40 C; 290/34; 180/65.4
(58) Field of Search ................. 290/29, 40 R, 290/40 C, 40 B, 34

(56) References Cited

U.S. PATENT DOCUMENTS

| | | | |
|---|---|---|---|
| 5,081,365 A | * 1/1992 | Field ........................... 290/45 |
| 5,261,291 A | * 11/1993 | Schoch ........................ 74/484 |
| 5,343,970 A | 9/1994 | Severinsky |
| 5,371,412 A | 12/1994 | Iwashita et al. |
| 5,755,303 A | * 5/1998 | Yamamoto ................. 180/65.2 |
| 5,778,997 A | * 7/1998 | Seaka ........................ 180/65.2 |
| 5,785,136 A | * 7/1998 | Falkenmayer ............. 180/65.2 |
| 5,785,137 A | * 7/1998 | Reuyl ........................ 180/65.2 |
| 5,786,640 A | * 7/1998 | Sakai .......................... 290/17 |
| 5,788,006 A | * 8/1998 | Yamaguchi ................ 180/65.2 |
| 5,820,172 A | * 10/1998 | Brigham ..................... 290/40 |
| 6,098,733 A | * 8/2000 | Ibaraki ...................... 180/65.2 |
| 6,109,237 A | * 8/2000 | Pels ........................... 123/339 |
| 6,176,808 B1 | 1/2001 | Brown et al. |
| 6,209,672 B1 | * 4/2001 | Severinsky ................ 180/65.2 |
| 6,351,698 B1 | * 2/2002 | Kubota ........................ 701/51 |

OTHER PUBLICATIONS

Office Of Transportation Technologies; 2 pages; Jul. 1999.

* cited by examiner

Primary Examiner—Nestor Ramirez
Assistant Examiner—Iraj A. Mohandesi
(74) Attorney, Agent, or Firm—Brooks & Kushman; Carlos L. Hanze

(57) ABSTRACT

This invention is a method and system for determining whether the engine should be running in a Hybrid Electric Vehicle during vehicle idle conditions. Specifically, a controller determines if the vehicle is in idle and if engine operation is necessary. To determine whether engine operation is necessary, the controller determines whether the battery needs charging, whether vacuum needs to be replaced in the climate control system or brake system reservoir, whether the vapor canister requires purging, whether the adaptive fuel tables require fast adapting, whether the engine or catalyst temperatures are unacceptable, or whether the air conditioning has been requested. Once the controller determines that the engine must be running, the controller determines in which control mode to run the engine, either speed control mode (using powertrain controllers) or torque control mode (using a generator and generator controller). Finally, the controller optimizes engine running conditions, to the extent possible depending upon the control mode, to perform any necessary functions during vehicle idle.

16 Claims, 2 Drawing Sheets

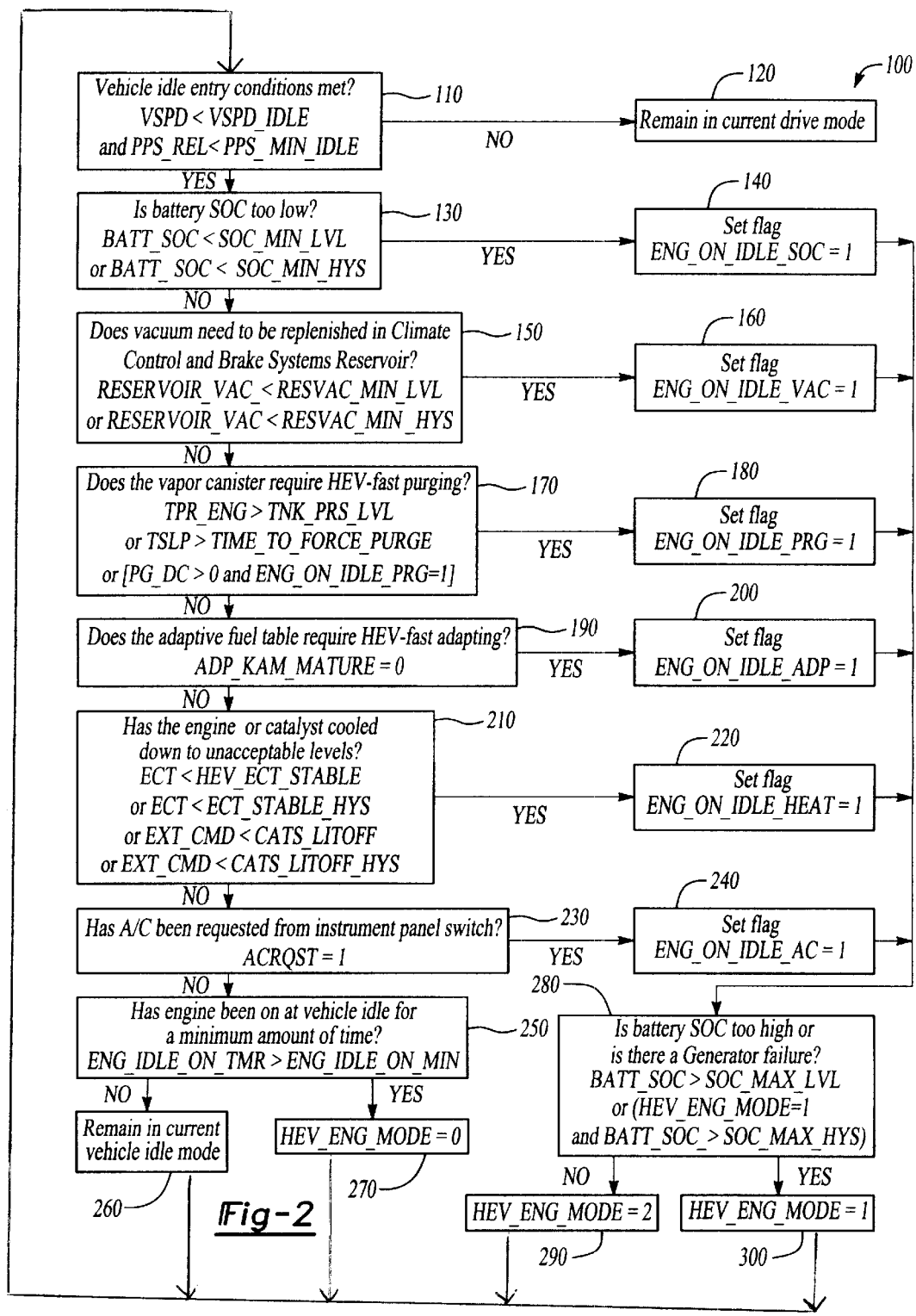

ENGINE ON IDLE ARBITRATION FOR A HYBRID ELECTRIC VEHICLE

BACKGROUND OF THE INVENTION

1. Field of the Invention

The present invention relates generally to a Hybrid Electric Vehicle (HEV), and specifically a method and system for an HEV to determine when the engine should operate during vehicle idle and under what parameters.

2. Discussion of the Prior Art

The need to reduce fossil fuel consumption and emissions in automobiles and other vehicles powered by Internal Combustion Engines (ICEs) is well known. Vehicles powered by electric motors attempt to address these needs. Unfortunately, electric vehicles have limited range and power capabilities. Further, electric vehicles need substantial time to recharge their batteries. An alternative solution is to combine a smaller ICE with electric motors into one vehicle. Such vehicles are typically called Hybrid Electric Vehicles (HEVs). See generally, U.S. Pat. No. 5,343,970 (Severinsky).

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A Parallel Hybrid Electrical Vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE.

A Parallel/Series Hybrid Electric Vehicle (PSHEV) has characteristics of both PHEV and SHEV configurations and is typically known as a "powersplit" configuration. In the PSHEV, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque powers the generator to charge the battery. The generator can also contribute to the necessary wheel (output shaft) torque. The traction motor is used to contribute wheel torque and to recover braking energy to charge the battery if a regenerative braking system is used. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drive-ability. Nevertheless, new ways must be developed to optimize the HEV's potential benefits.

One such area of development is HEV engine operation. In an HEV, the engine has multiple functions. The engine's first and most obvious purpose is to provide wheel torque. The engine also is necessary for many secondary functions. While the engine is running the HEV can also: spin the generator to charge a battery, purge a fuel vapor canister, mature its adaptive fuel tables, operate its air-conditioning (A/C) system, replenish vacuum to the A/C and brake systems, and maintain optimal engine and catalyst temperatures. Each of these secondary functions has separate optimal engine operating conditions and no one idle speed is optimal for each. Therefore, if the engine is operating at optimal speed for one secondary function, while other functions are possible, they may not be completed as efficiently or quickly.

The HEV engine has many functions that require it to be running. Nevertheless, the main goals of HEVs are reduction of fuel usage, emissions, and increasing run time (i.e., the length of time the vehicle can operate without refueling or recharging). The HEV can achieve these goals by turning the engine off when it is not needed. Fortunately, the secondary HEV engine functions do not require the engine to run all the time. The battery and traction motor are capable of providing sufficient driving torque for many driving conditions.

Engine usage parameters, and specifically, engine run time, are divided into two categories including drive conditions, where wheel torque is supplied, and idle conditions. Idle conditions exist when the vehicle is not moving. Generally, it is desirable to turn the engine off during idle conditions. Nevertheless, the secondary functions may still require a running engine. The prior art has not addressed the problem of determining when the engine should run during idle conditions and what parameters optimize the performance of the desired secondary function.

SUMMARY OF THE INVENTION

Accordingly, an object of the present invention is to provide a method and system to determine when the engine should operate during vehicle idle and under what parameters for a hybrid electric vehicle (HEV). The present invention provides a method and system to implement a logic arbitration scheme allowing a Vehicle System Controller (VSC) to determine if the engine should run during idle conditions and, if so, at what operating parameters.

The method and system to determine engine operation during idle comprises determining if idle conditions are met, determining if engine operation is necessary, determining a method of engine control, and operating the engine at the most efficient operating parameters. Vehicle speed establishes whether idle conditions exist or whether the vehicle is in motion. Accelerator position is established to determine torque requests. The method and system also determine when engine operation is necessary. A controller determines whether the battery needs charging, whether vacuum needs replenishing in the climate control system or brake system reservoir, whether a vapor canister requires purging, whether the Adaptive Fuel Tables require fast adapting, whether the engine or catalyst temperatures are unacceptably low, and if air conditioning has been requested. If any determinations are positive, the controller turns (sets to 1) the appropriate "engine on" idle flag for that function and proceeds to determine the appropriate engine control mode.

To determine the appropriate method of engine control, the controller determines whether the battery state of charge is too high or whether generator failure exists. If the state of charge is not too high and generator failure does not exist, the engine is run in torque control mode through a generator controller. Otherwise, the engine is run in speed control mode through powertrain controllers. If the engine is operated in speed control mode, typical engine control is employed through the use of spark and air feedback. However, if torque control mode is employed, the vehicle is run at optimum conditions by the generator controller for the desired function.

The system for determining whether the engine should run during idle comprises many vehicle components including an engine, a vehicle system controller, battery, battery state of charge determination system, climate control system requests, brake control system, climate system and brake system reservoir vacuum determination, a vapor canister, vapor canister purging need determination, adaptive fuel tables, adaptive fuel tables mature determination, engine and catalyst temperature determination, an air conditioning system, a generator, a means to control HEV components including a generator controller, a powertrain controller and a battery controller.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which:

FIG. 2 illustrates a logic flow diagram for controlling engine idle speed according to a preferred embodiment of the present invention.

DETAILED DESCRIPTION OF THE PREFERRED EMBODIMENT

Figure 1:
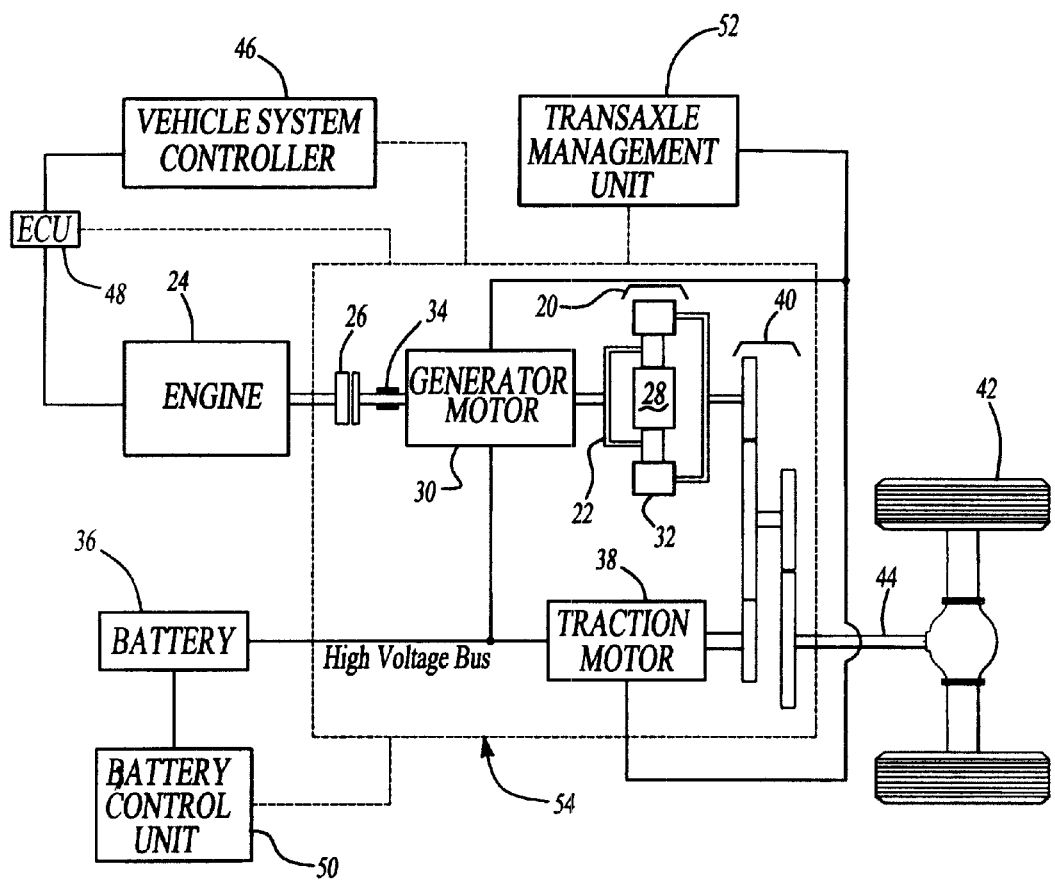
FIG. 1 illustrates a general hybrid electric vehicle (HEV) configuration.

The present invention relates to Hybrid Electric Vehicles (HEVs). FIG. 1 demonstrates just one possible configuration, specifically a Parallel/Series Hybrid Electric Vehicle (powersplit) configuration.

In a basic HEV, a Planetary Gear Set 20 mechanically couples a Carrier Gear 22 to an Engine 24 via a One Way Clutch 26. The Planetary Gear Set 20 also mechanically couples a Sun Gear 28 to a Generator Motor 30 and a Ring (output) Gear 32. The Generator Motor 30 also mechanically links to a Generator Brake 34 and is electrically linked to a Battery 36. A Traction Motor 38 is mechanically coupled to the Ring Gear 32 of the Planetary Gear Set 20 via a Second Gear Set 40 and is electrically linked to the Battery 36. The Ring Gear 32 of the Planetary Gear Set 20 and the Traction Motor 38 is mechanically coupled to Drive Wheels 42 via an Output Shaft 44.

The Planetary Gear Set 20, splits the Engine 24 output energy into a series path from the Engine 24 to the Generator Motor 30 and a parallel path from the Engine 24 to the Drive Wheels 42. Engine 24 speed can be controlled by varying a split to the series path while maintaining a mechanical connection through the parallel path. The Traction Motor 38 augments the Engine 24 power to the Drive Wheels 42 on the parallel path through the Second Gear Set 40. The Traction Motor 38 also provides the opportunity to use energy directly from the series path, essentially running off power created by the Generator Motor 30, thereby reducing losses associated with converting energy into and out of chemical energy in the Battery 36.

A Vehicle System Controller (VSC) 46 controls many components in this HEV configuration by connecting to each component's controller. The VSC 46 connects to the Engine 24 via a hardwire interface and Engine Control Unit (ECU) 48. The ECU 48 and the VSC 46 can be based in the same unit, but are actually separate controllers. The VSC 46 also connects to a Battery Control Unit (BCU) 50, and a Transaxle Management Unit (TMU) 52 through a communication network such as a Controller Area Network (CAN) 54. The BCU 50 connects to the Battery 36 via the hardwire interface. The TMU 52 controls the Generator Motor 30 and Traction Motor 38 via the hardwire interface.

Desired HEV efficiency and optimization goals require optimal control of the Engine 24. The present invention provides a method and system to determine if the Engine 24 should be running and, if so, at what operating conditions.

FIG. 2 illustrates an engine Idle Speed Control Strategy 100 that is utilized by VSC 46. First, in Step 110, a determination is made as to whether vehicle idle entry conditions are met. To be in vehicle idle entry conditions, the vehicle speed ("VSPD") must be below a predetermined minimum value ("VSPD_IDLE") and accelerator position ("PPS_REL") must be below a minimum level ("PPS_MIN_IDLE"). If the vehicle idle entry conditions are not met, the vehicle will remain in the current drive mode as in Step 120, otherwise proceed to Step 130.

In Step 130, a determination is made as to whether battery state of charge ("BATT_SOC") is too low. This is accomplished by either determining whether BATT_SOC is lower than a predetermined minimum value (SOC_MIN_LVL) on the first pass or whether BATT_SOC is below a predetermined level that factors in hysteresis (SOC_MIN_HYS) on any subsequent pass. If the BATT_SOC is too low, proceed to Step 140, otherwise proceed to Step 150.

In Step 140, the Engine 24 is kept on at idle speed until the state of charge of the Battery 36 is acceptable. This is referred to as ENG_ON_IDLE_SOC=1 mode. While the Engine 24 is in ENG_ON_IDLE_SOC=1 mode, a vacuum reservoir (not shown) can be replenished as per the amount of vacuum available from the amount of engine brake torque requested. Also, conventional purge and adaptive fuel strategies may run in normal modes. Further, if the vehicle operator requests air conditioning, the amount of engine brake torque required may be modified to accommodate this slight state of charge change. Finally, the Engine 24 and inferred (or measured) catalyst (not shown) temperatures will be increased or maintained naturally, as the system requires. The logic then proceeds to Step 280.

In Step 150, a determination is made as to whether the vacuum needs to be replenished in a climate control system (not shown) and brake system's reservoir (not shown). This is accomplished by determining whether the reservoir vacuum (RESERVOIR_VAC) is below a predetermined minimum level (RESVAC_MIN_LVL) on the first pass or whether RESERVOIR_VAC is below a predetermined level that factors in hysteresis (RESVAC_MIN_HYS) on any subsequent pass. If the vacuum needs replenishing, proceed to Step 160, otherwise proceed to Step 170.

In Step 160, the Engine 24 is kept on at idle speed until the vacuum level reaches an acceptable level (ENG_ON_IDLE_VAC=1). This is accomplished by scheduling a desired engine brake torque that will produce enough vacuum to replenish the reservoir quickly. At the same time, the Battery 36 can be charged at a rate dictated by the amount of engine brake torque requested. Further, the conventional purge and adaptive fuel strategies may be run in normal modes. If air conditioning is requested by the vehicle operator, the amount of engine brake torque may be modified slightly to compensate for a slight vacuum change. Finally, Engine 24 and catalyst temperatures may be increased or maintained naturally, as the system requires. The logic then proceeds to Step 280.

In Step 170, a determination is made as to whether a vapor canister (not shown) requires HEV-fast purging. To determine this, one of three inquiries is made by the VSC 46. The VSC 46 may determine whether a fuel tank pressure (TPR_ENG) is above a predetermined maximum level (TNK_PRS_LVL). Alternatively, the VSC 46 may determine whether the time since the last purge has been too long (TSLP>TIME_TO_FORCE_PURGE). Also, the VSC 46 may determine whether the vapor canister is already purging (PG_DC>0) and whether the Engine 24 is on at idle speed until the purge is completed (ENG_ON_IDLE_PRG=1). If the answer to any of these scenarios is no, proceed to Step 190, otherwise proceed to Step 180.

In Step 180, the Engine 24 is kept on at idle speed until the purging of the vapor canister is completed, where ENG_ON_IDLE_PRG=1. This is accomplished by scheduling a desired brake torque that will produce vacuum so that an aggressive purge rate can be employed to clean the vapor canister as quickly as possible. At the same time, the Battery 36 can be recharged at a rate dictated by the amount of engine brake torque scheduled. Also, the vacuum reservoir can be replenished per the amount of vacuum available from the amount of brake torque scheduled. If the vehicle operator requests air conditioning, minor adjustments may be made to the amount of brake torque scheduled to accommodate this request. Finally, the Engine 24 and catalyst temperatures will be increased or maintained naturally. Once vapor purge is completed, proceed to Step 280.

In Step 190, a determination is made as to whether an adaptive fuel table requires HEV-fast adapting (ADP_KAM_MATURE=0). This occurs when the VSC 46 has not learned the fuel system shifts (which are written to a table and "keep-alive memory") for this particular drive cycle. If the adaptive fuel table requires HEV-Fast adapting, proceed to Step 200, otherwise proceed to Step 210.

In Step 200, the Engine 24 is kept on at idle speed until the fuel adapting is completed (ENG_ON_IDLE_ADP=1). This is accomplished by scheduling the desired engine brake torque that will produce the engine airflow that is needed to learn fuel shifts. Preferably, this is accomplished by a slow sweep of brake torque to cover the range of airflows. At the same time, the Battery 36 can be charged at a rate dictated by the amount of engine brake torque requested. Further, the vacuum reservoir can be replenished per the amount of vacuum available from the amount of engine brake torque requested. If air conditioning (not shown) is requested, the amount of engine torque requested will be modified slightly to accommodate the request. Finally, the Engine 24 and catalyst temperatures will be increased or maintained naturally. The logic then proceeds to Step 280.

Next, in Step 210, a determination is made as to whether the Engine 24 or catalyst has cooled to unacceptable levels. A two step analysis is undertaken to determine this. First, with respect to the Engine 24, a determination is made on the first pass whether the Engine 24 is too cool to provide cabin heat (ECT<HEV_ECT_STABLE) or whether ECT is below a predetermined level that factors in hysteresis (ECT_STABLE_HYS) on any subsequent pass. If the Engine 24 has cooled down below a predetermined acceptable level, proceed to step 220. If the Engine 24 has not cooled below the predetermined acceptable level, the catalyst is checked to see if it has cooled to unacceptable performance levels on the first pass (EXT_CMD<CATS_LITOFF) or whether EXT_CMD is below a predetermined level that factors in hysteresis (CATS_LITOFF_HYS) on any subsequent pass. If the catalysts have cooled below a predetermined acceptable level, proceed to Step 220, otherwise proceed to Step 230.

In Step 220, the Engine 24 is kept on at idle speed until the ECT and catalyst temperatures reach an acceptable level (ENG_ON_IDLE_HEAT=1). This is accomplished by scheduling a desired engine brake torque that will minimize fuel consumption while providing heat to the Engine 24 and catalyst quickly. At the same time, the Battery 36 can be charged at a rate dictated by the amount of engine brake torque requested. Further, the vacuum reservoir can be replenished per the amount of vacuum available from the amount of engine brake torque requested. If air conditioning is requested, the amount of engine torque requested will be modified slightly to accommodate the request. Finally, the engine and catalyst temperatures will be increased or maintained naturally. The logic then proceeds to Step 280.

Next in Step 230, a determination is made as to whether air conditioning has been requested from an instrument panel switch (not shown) (ACRQST=1). If it has, proceed to Step 240, otherwise proceed to Step 250.

In Step 240, the Engine 24 is kept on at idle speed until an air conditioning panel is switched off (ENG_ON_IDLE_AC=1). To accomplish this, the desired engine torque is scheduled that will minimize fuel consumption while accommodating this request. At the same time, the Battery 36 can be charged at a rate dictated by the amount of engine brake torque requested. Further, the vacuum reservoir can be replenished per the amount of vacuum available from the amount of engine brake torque requested. Further, conventional purge and adaptive fuel strategies can be run in normal modes. Finally, the engine and catalyst temperatures will be increased or maintained naturally. The logic then proceeds to Step 280.

In Step 250, a determination is made as to whether the Engine 24 has been on at vehicle idle condition for a minimum amount of time (ENG_IDLE_ON_TMR>ENG_IDLE_ON_MIN). This is done to prevent too much engine on/off cycling at vehicle idle. If the Engine 24 has not been on for the minimum time, Step 260 dictates that the vehicle remain in the current idle mode. If the Engine 24 has been on for the minimum time, Step 270 directs that the Engine 24 is turned off (HEV_ENG_MODE=0). This can occur, for example, when a vehicle has been stopped at a stop light for a predetermined minimum amount of time. From either Step 260 or 270, the logic proceeds back to Step 110.

In Step 280, a determination is made as to whether the battery SOC is above a predetermined maximum level or whether there is generator failure. First, with respect to the battery SOC, a determination is made on the first pass to determine if the battery SOC is too high (BATT_SOC>SOC_MAX_LVL) or whether the battery SOC is above a predetermined level that factors in hysteresis (BATT_SOC>SOC_MAX_HYS) on any subsequent pass. If yes, proceed to Step 300. If no, determine whether the Generator Motor 30 has failed. If it has not, proceed to Step 290, otherwise proceed to Step 300.

In Step 290, a primary engine idle mode is activated for vehicle idle conditions (HEV_ENG_MODE=2). In this mode, the vehicle system VSC 46 controls the Generator Motor 30 rotational speed, which in turn controls the Engine 24 idle speed.

In Step 300, the secondary engine idle mode is activated for vehicle idle conditions (HEV_ENG_MODE=1). In this mode, the Generator Motor 30 is shut off, and the Vehicle System Controller 46 controls the engine idle speed via conventional control of fuel, airflow, and ignition timing. After Steps 290 or 300, the logic proceeds back to Step 110.

The above invention provides a dual method for controlling Engine 24 idle speed in an HEV to accommodate any possible HEV idle situation. The invention uses the Generator Motor 30 coupled to the VSC 46 to control Engine 24 speed for most of the "engine-on" idle modes. As fully described above, operating conditions for which this type of control is used, include steps 130, 150, 170, 190, 210 and 230. These operating conditions may be referred to as a predetermined first set of operating conditions. In alternative situations, such as high battery state of charge or generator failure, the VSC 46 passes control of engine idle speed to the Engine Control Unit 48. These operating conditions may be referred to as a predetermined second set of operating conditions. The invention results in perceived tighter speed control feel by having fewer perturbations in Engine 24 speed.

This Engine Idle Speed Control Strategy 100 illustrated in FIG. 2 must be consistent with an Engine "ON" Idle Arbitration Logic that is the subject of the present invention. Basically, the Arbitration Logic proposed for the Engine Idle Speed Control Strategy 100 utilizes Engine "ON" scenarios. These scenarios are developed to identify situations when the Engine 24 should be running.

If the engine runs in speed control mode (HEV_ENG_MODE=1), the engine will control its own "idle" speed by conventional means (feedback spark and air control) and the generator is commanded to deliver zero torque. In this mode the vacuum reservoir can be replenished (per the amount of vacuum available from the engine idle speed), conventional purge and adaptive fuel strategies can run, engine and catalyst temperature will be increased/maintained naturally, and if the A/C is requested, the amount of torque required is already compensated via a conventional A/C airflow idler.

If the Engine 24 is run in torque mode (HEV_ENG_MODE=2), the desired engine brake torque is scheduled depending on which "engine on idle requester" is on. In this mode the generator motor controls engine speed, allowing the engine to run at optimum level for the necessary function. Depending on which flag is set, the following Engine 24 operating conditions exist:

If ENG_ON_IDLE_SOC=1, a desired Engine 24 brake torque that will produce the desired Battery 36 charging rate is scheduled. At the same time, the vacuum reservoir can be replenished (per the amount of vacuum available from the amount of engine brake torque requested to charge the battery); conventional purge and adaptive fuel strategies can run like normal; if A/C is requested, the amount of torque required is already compensated for; and, engine and catalyst temperatures are increased/maintained naturally.

If ENG_ON_IDLE_VAC=1, then a desired engine brake torque (i.e., small) is scheduled that will produce enough vacuum to replenish the reservoir quickly. At the same time, the battery can be charged (at a rate dictated by amount of engine brake torque requested to replenish the vacuum); conventional purge and adaptive fuel strategies can run like normal; if A/C is requested, the amount of torque required is already compensated for; and, engine and catalyst temperatures are increased/maintained naturally.

If ENG_ON_IDLE_PRG=1, a desired engine brake torque (i.e., small) that will produce vacuum so that an aggressive purge rate can be employed to clean the vapor canister as quickly as possible is scheduled. At the same time, the battery can be charged (at a rate dictated by amount of engine brake torque requested to purge); the vacuum reservoir can be replenished (per the amount of vacuum available from the amount of engine brake torque requested to purge); if A/C is requested, the amount of torque required is already compensated for; and, engine and catalyst temperatures are increased/maintained naturally.

If ENG_ON_IDLE_ADP=1, a desired engine brake torque that will produce Engine 24 airflows that are needed to learn the fuel shifts is scheduled. (This could be a slow sweep of torque to cover a range of airflows.) At the same time, the battery can be charged (at a rate dictated by amount of engine brake torque requested to learn the fuel shifts); the vacuum reservoir can be replenished (per the amount of vacuum available from the amount of engine brake torque requested to learn the fuel shifts); if A/C is requested, the amount of torque required is already compensated for; and, engine and catalyst temperatures will be increased/maintained naturally.

If ENG_ON_IDLE_HEAT=1, a desired engine brake torque that will minimize fuel consumption while producing heat to warm the engine and catalyst quickly is scheduled. At the same time, the battery can be charged (at a rate dictated by amount of engine brake torque requested to warm the engine and catalyst); the vacuum reservoir can be replenished (per the amount of vacuum available from the amount of engine brake torque requested to warm the engine and catalyst); conventional purge and adaptive fuel strategies can run like normal; and, if A/C is requested, the amount of torque required is already compensated for.

If ENG_ON_IDLE_AC=1, a desired engine brake torque that will minimize fuel consumption while accommodating the request for A/C is scheduled. At the same time, the battery can be charged (at a rate dictated by amount of engine brake torque requested to run the A/C); the vacuum reservoir can be replenished (per the amount of vacuum available from the amount of engine brake torque requested to run the A/C); conventional purge and adaptive fuel strategies can run like normal; and, engine and catalyst temperatures are increased/maintained naturally.

Note the function whose flag is first turned on gets priority over all other functions in determining engine brake torque conditions. If a different priority is desired, the logic order can change, placing the desired high priority function first and the desired low priority function last in the logic chain.

It is understood that the invention is not limited by the exact construction or method illustrated and described above, but that various changes and/or modifications may be made without departing from the spirit and/or the scope of the inventions.

We claim:

1. A method for controlling idle speed of an engine in a hybrid electric vehicle, the vehicle including a battery, a generator operatively coupled to the engine, an engine controller, and a vehicle system controller, the method comprising:

determining whether a set of vehicle idle entry conditions are met, the idle entry conditions being met when the vehicle speed is below a predetermined value and an accelerator pedal is below a predetermined minimum pedal position;

selectively activating the vehicle system controller to control the generator to control engine idle speed when any one of a predetermined first set of operating conditions is present;

selectively activating the engine controller to control engine idle speed when a predetermined second set of operating conditions is present; and turning off the engine when both the predetermined first set of conditions is not present and the engine has been in a current vehicle idle mode for a predetermined amount of time.

2. The method of claim 1, wherein the vehicle system controller is selectively activated to control engine idle speed when a battery state of charge is below a predetermined minimum value.

3. The method of claim 1, wherein the vehicle further includes a climate control reservoir, and the vehicle system controller is selectively activated to control engine idle speed when a vacuum in the climate control reservoir is below a predetermined minimum level.

4. The method of claim 1, wherein the vehicle further includes a brake system reservoir, and the vehicle system controller is selectively activated to control engine idle speed when a vacuum in the brake system reservoir is below a predetermined minimum level.

5. The method of claim 1, wherein the vehicle further includes a vapor canister, and the vehicle system controller is selectively activated to control engine idle speed when the vapor canister requires purging.

6. The method of claim 1, wherein the vehicle further includes an adaptive fuel table, and the vehicle system controller is selectively activated to control engine idle speed when the adaptive fuel table requires fast adaptive learning.

7. The method of claim 1, wherein the vehicle system controller is selectively activated to control engine idle speed when the engine has cooled below a predetermined level.

8. The method of claim 1, wherein the vehicle further comprises a catalyst, and the vehicle system controller is selectively activated to control the engine idle speed when the catalyst has cooled below a predetermined level.

9. The method of claim 1, wherein the vehicle system controller is selectively activated to control engine idle speed when air conditioning has been requested by a vehicle operator.

10. The method of claim 1, wherein the vehicle system controller is selectively activated to control engine idle speed when the generator has failed or a battery state of charge exceeds a predetermined maximum level.

11. A hybrid electric vehicle including a generator having a rotor assembly operatively coupled to an engine, the hybrid electric vehicle comprising:

a vehicle system controller for controlling idle speed of the engine when a battery state of charge is below a predetermined level and the generator has not failed; and an engine controller for controlling the idle speed of the engine when the battery state of charge exceeds a predetermined maximum level or the generator fails.

12. The method of claim 1, wherein the predetermined first set of operating conditions comprises a low battery state of charge, a low climate control vacuum level, a low brake system reservoir vacuum level, a high fuel tank pressure, the existence of a minimum time period since a last vapor canister purging, the existence of current vapor canister purging, the existence of a learned adaptive fuel table for the current driving mode, a low engine temperature, a low catalyst temperature, and the state of activation of an air conditioning switch.

13. The method of claim 1, wherein the predetermined second set of operating conditions comprises a high battery state of charge and a failed generator.

14. A method for controlling idle speed of an engine in a hybrid electric vehicle, the vehicle including a battery, a generator operatively coupled to the engine, an engine controller, and a vehicle system controller, the method comprising:

determining whether a set of vehicle idle entry conditions are met, the idle entry conditions being met when the vehicle speed is below a predetermined value and an accelerator pedal is below a predetermined minimum pedal position;

selectively activating the vehicle system controller to control the generator to control engine idle speed when any one of a predetermined first set of operating conditions is present, the first set of operating conditions including a low battery state of charge, a low climate control vacuum level, a low brake system reservoir vacuum lever, a high fuel tank pressure, the existence of a minimum time period since a last vapor canister purging, the existence of current vapor canister purging, the existence of a learned adaptive fuel table for the current driving mode, a low engine temperature, a low catalyst temperature, and the state of activation of an air conditioning switch;

selectively activating the engine controller to control engine idle speed when a predetermined second set of operating conditions is present; and turning off the engine when both the predetermined first set of conditions is not present and the engine has been in a current vehicle idle mode for a predetermined amount of time.

15. The method of claim 14, wherein the predetermined second set of operating conditions comprises a high battery state of charge and a failed generator.

16. A method for controlling idle speed of an engine in a hybrid electric vehicle, the vehicle including a battery, a generator operatively coupled to the engine, an engine controller, and a vehicle system controller, the method comprising:

determining whether a set of vehicle idle entry conditions are met, the idle entry conditions being met when the vehicle speed is below a predetermined value and an accelerator pedal is below a predetermined minimum pedal position;

selectively activating the vehicle system controller to control the generator to control engine idle speed when any one of a predetermined first set of operating conditions is present;

selectively activating the engine controller to control engine idle speed when a predetermined second set of operating conditions is present, the predetermined second set of operating conditions including a high battery state of charge and a failed generator; and turning off the engine when both the predetermined first set of conditions is not present and the engine has been in a current vehicle idle mode for a predetermined amount of time.

* * * * *